H. D. ANDERSON.
ROTARY INTERNAL COMBUSTION MOTOR.
APPLICATION FILED JULY 16, 1920.

1,400,255.

Patented Dec. 13, 1921.

H. D. Anderson INVENTOR

BY Victor J. Evans

ATTORNEY

WITNESS

H. D. ANDERSON.
ROTARY INTERNAL COMBUSTION MOTOR.
APPLICATION FILED JULY 16, 1920.

1,400,255.

Patented Dec. 13, 1921.
7 SHEETS—SHEET 6.

H. D. ANDERSON.
ROTARY INTERNAL COMBUSTION MOTOR.
APPLICATION FILED JULY 16, 1920.

1,400,255.

Patented Dec. 13, 1921.
7 SHEETS—SHEET 7.

WITNESS:
Edwin G. McKee

H. D. Anderson INVENTOR
BY Victor J. Evans
ATTORNEY

UNITED STATES PATENT OFFICE.

HENRY D. ANDERSON, OF FILER, IDAHO.

ROTARY INTERNAL-COMBUSTION MOTOR.

1,400,255.   Specification of Letters Patent.   Patented Dec. 13, 1921.

Application filed July 16, 1920. Serial No. 396,678.

*To all whom it may concern:*

Be it known that I, HENRY D. ANDERSON, a citizen of the United States, residing at Filer, in the county of Twin Falls and State of Idaho, have invented new and useful Improvements in Rotary Internal-Combustion Motors, of which the following is a specification.

The object of my present invention is the provision of an internal combustion rotary motor that is simple, inexpensive and compact in construction; is efficient in operation, and is devoid of delicate parts such as are liable to get out of order after a short period of use.

To the attainment of the foregoing, the invention consists in the improvement as hereinafter described and definitely claimed.

In the accompanying drawings, hereby made a part hereof:

Similar numerals of reference designate corresponding parts in all the views of the drawings.

The body 1 of the main cylinder or cylindrical casing of the motor is mounted upon standards 2, and is provided at 3 with an intake for explosive mixture, and at 4 with an exhaust for products of combustion. At 5 the said body 1 is provided with a spark plug designed for connection in the usual manner with a source of electrical energy. In addition to the body 1 the cylinder or casing comprises front and rear covers or face plates 6 and 7, the said covers being provided in their inner sides with cam grooves 8, preferably of general elliptical form as illustrated.

Figure 7:
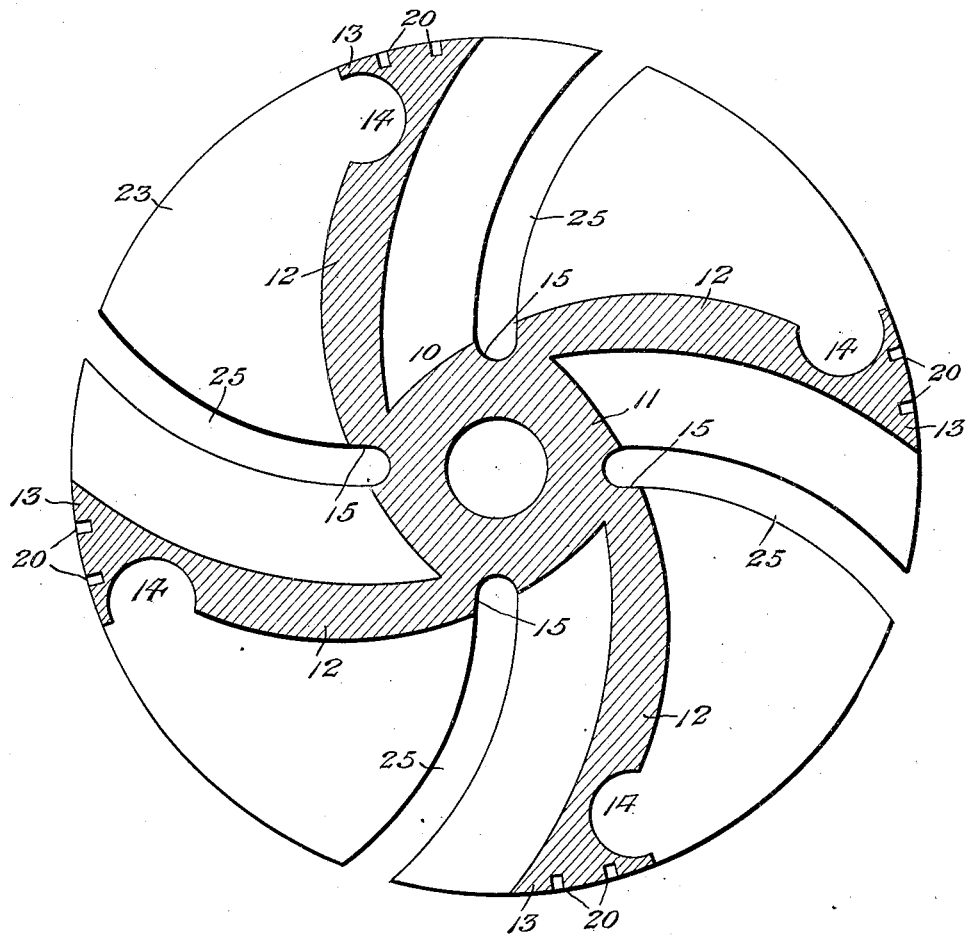
Fig. 7 is a detail longitudinal vertical section of the wheel or rotary member *per se* of the motor.
Figure 8:
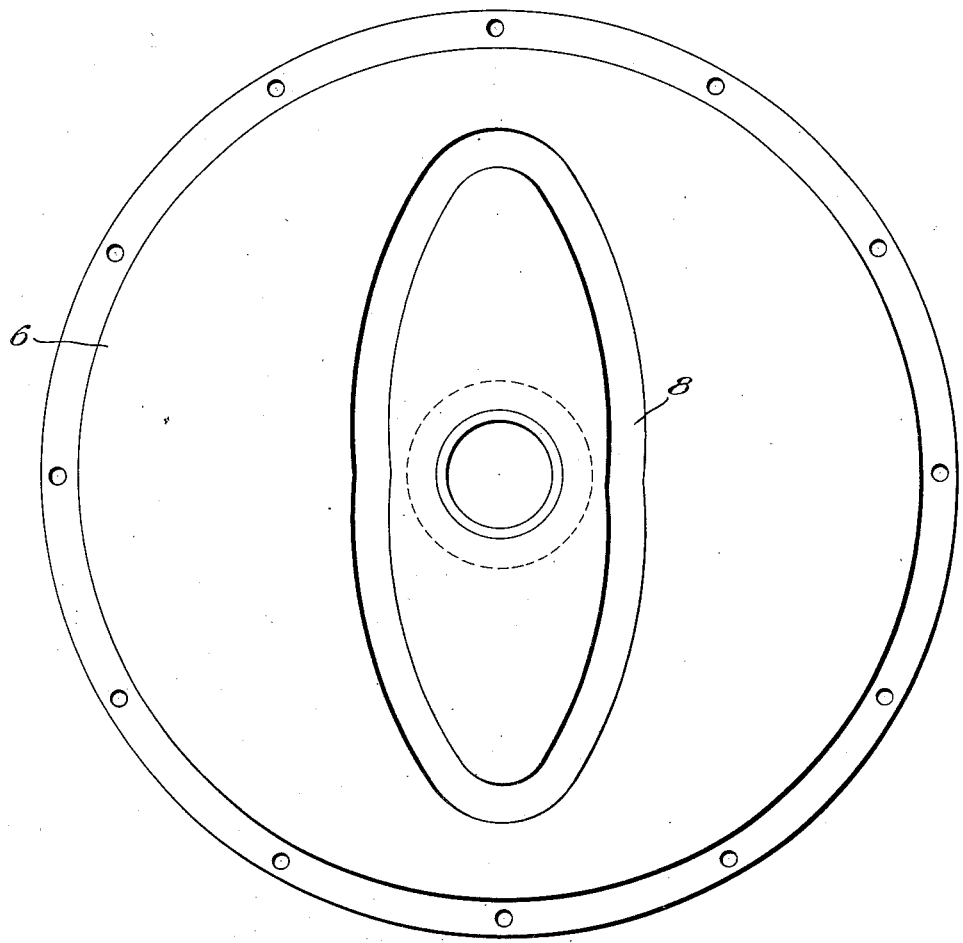
Fig. 8 is an elevation showing the inner side of one of the face plates of the motor and the cam groove therein.

Extending transversely through the center of the cylindrical casing is a transverse shaft 9 on which is fixed the turbine wheel or rotary member 10, best shown in Fig. 7. The said wheel 10 is made in one piece, and includes a hub 11 and four curvilinear arms 12. The outer ends 13 of the said arms 12 describe parts of a circle, and in the convex sides of the arms are provided seats 14 and 15, the seats 14 being comparatively large and describing more than halves of circles, and the comparatively small seats 15 describing less than halves of circles.

Figure 3:
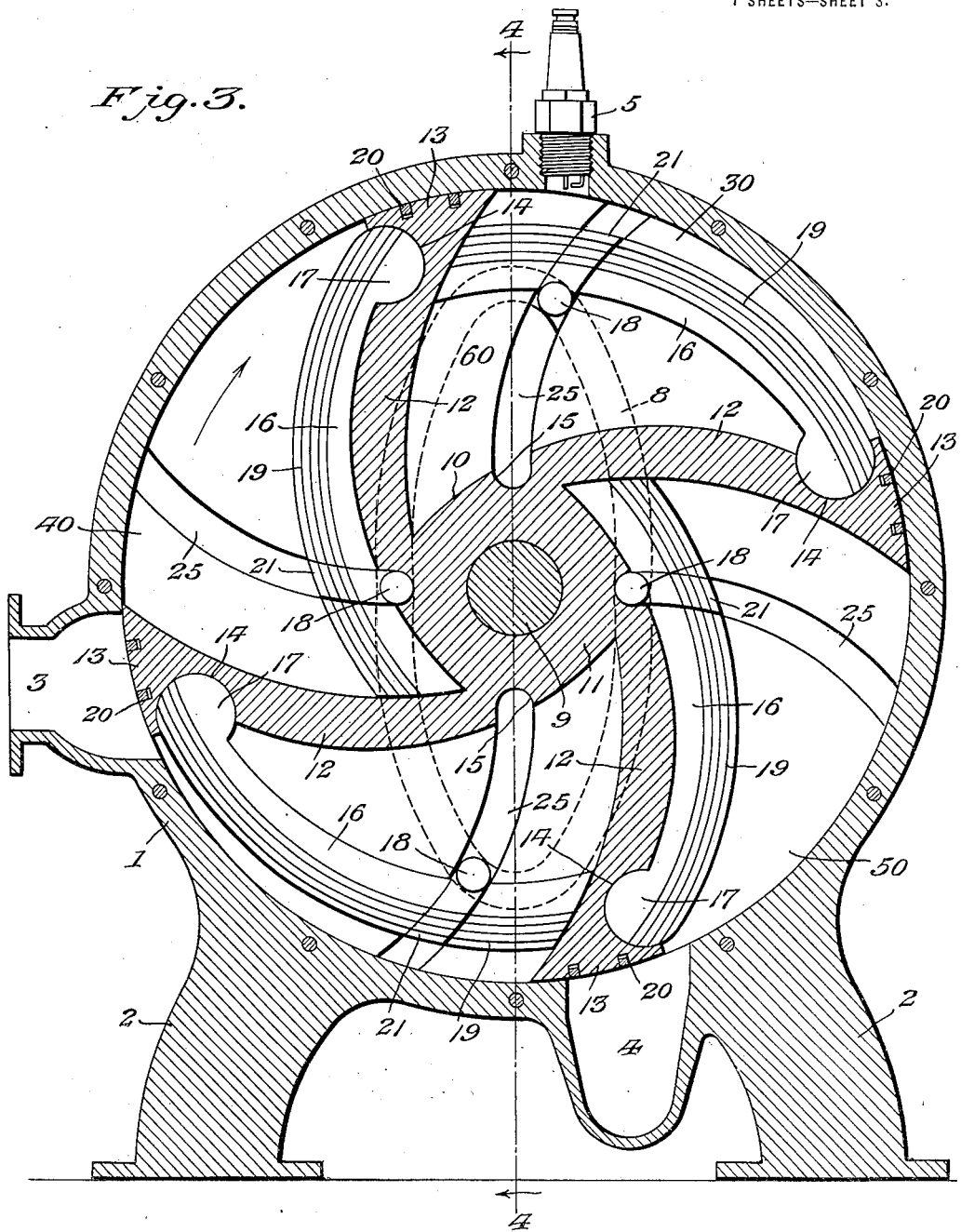
Fig. 3 is a longitudinal vertical section of the motor.
Figure 6:
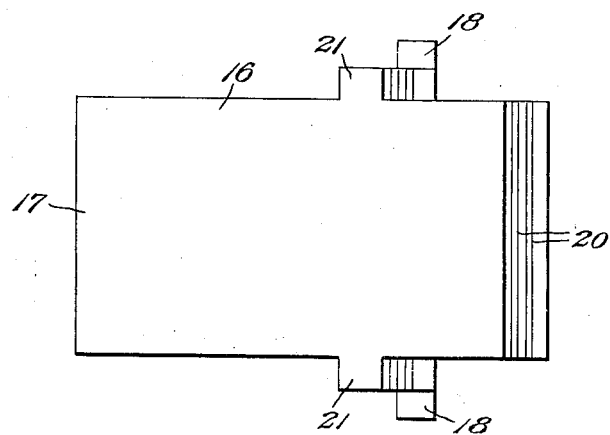
Fig. 6 is a view of one of the pistons of the motor.
Figure 9:
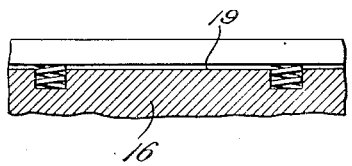
Fig. 9 is a detail section showing a portion of one of the pistons 16 and one of the packing strips thereon.

In conjunction with the wheel 10, I employ four pistons 16, one of which is clearly shown in Fig. 6. The pistons 16 are identical in construction, and therefore a detailed description of the one shown in the figure just alluded to will suffice to impart a definite understanding of all. It will be noted that the piston is of general curvilinear configuration, Fig. 3, is provided at one end with a circular enlargement or trunnion 17 to bear in one of the seats 14, and is also provided at its inner side and adjacent to its opposite and outwardly and inwardly moving end with a stop portion 18, of circular form in cross-section. This stop portion 18 extends laterally in opposite directions beyond the vertical sides of the piston, and is designed when the piston is in its innermost position to rest in the adjacent seat 15. The extended ends of said portion 18 are movable in the cam grooves 8 of the covers or face plates 6 and 7, and therefore during the rotation of the wheel 10, the said cam grooves will control the outward and inward swinging movements of the piston. The operation described is true of all of the pistons. It will also be noted by particular reference to Figs. 3, 4 and 9, that each piston is provided with grooves 19 for packing strips, with grooves 20 for the same purpose, and with lateral knob projections 21.

Figure 4:
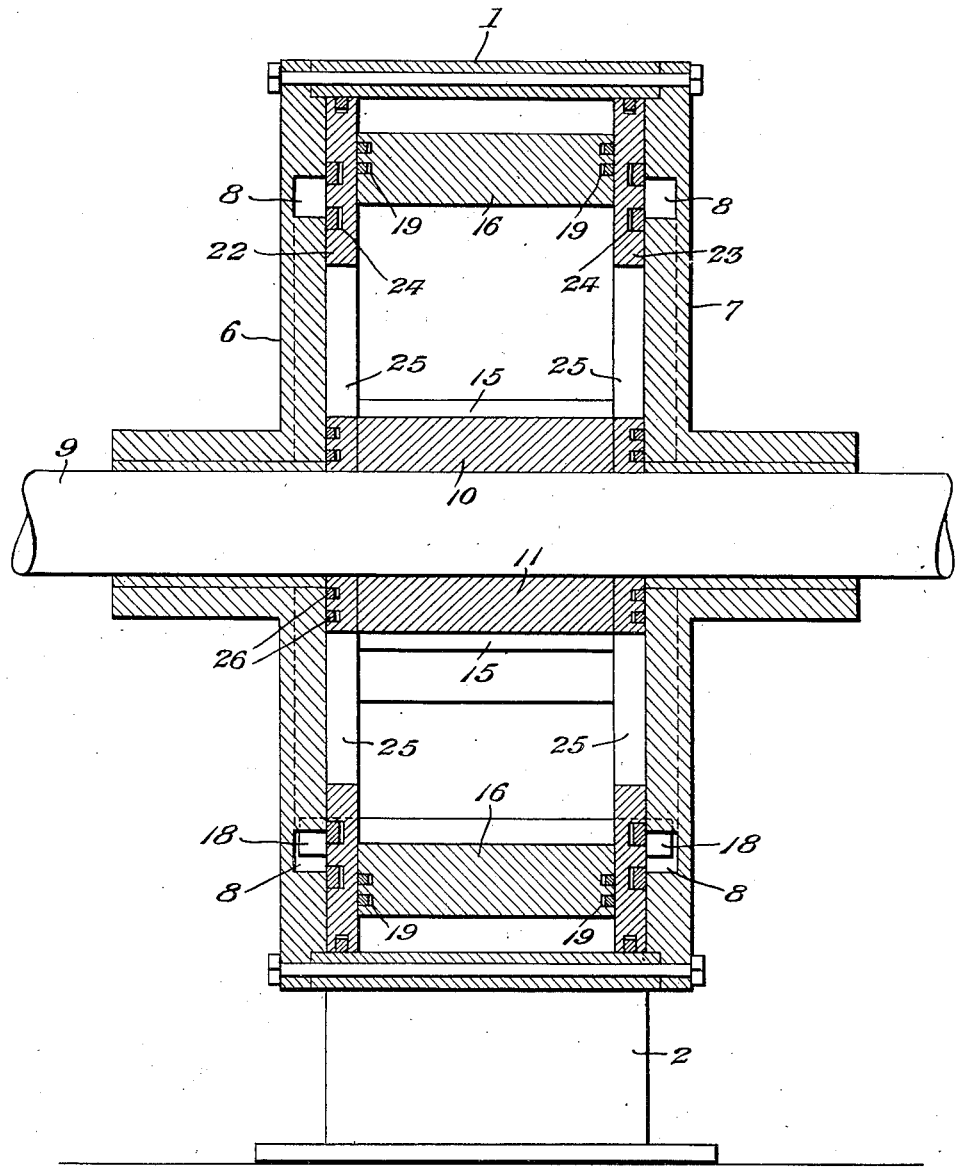
Fig. 4 is a diametrical section of the motor taken in the plane indicated by the line 4—4 of Fig. 3.
Figure 5:
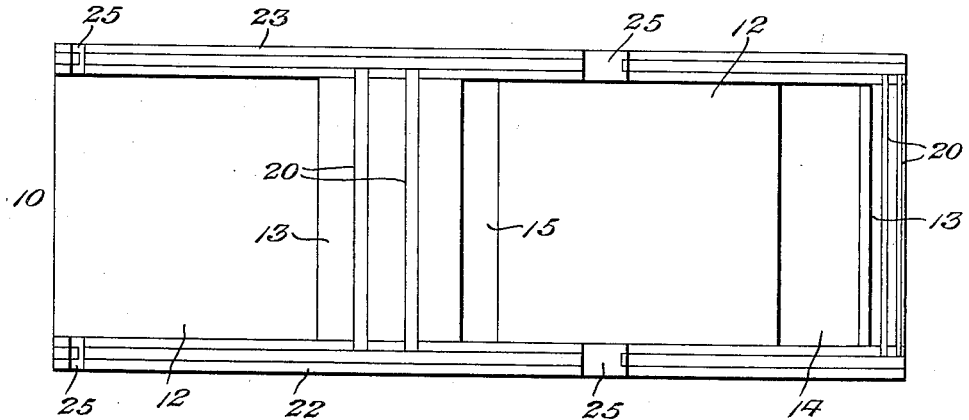
Fig. 5 is a top plan view of the wheel or rotary member of the motor.

As best shown in Figs. 4 and 5, the turbine wheel sides 22 and 23 are provided with packing strip groves 24 and channels 25; the grooves 24 being curvilinear and arranged in four groups, and the channels 25 being also curvilinear and arranged each channel 25 between two pairs of grooves 24.

Figure 2:
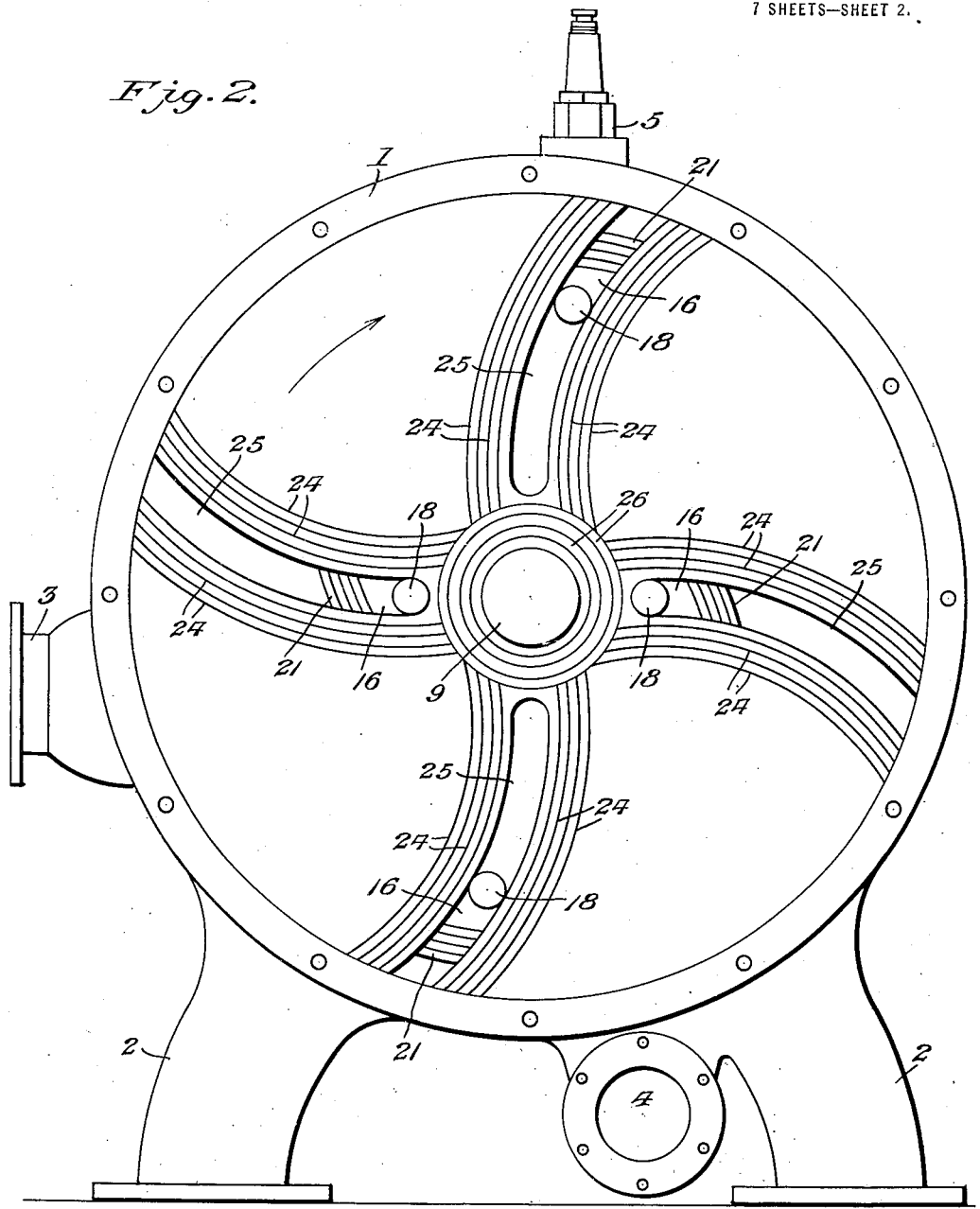
Fig. 2 is an elevation showing the motor with the face plate illustrated in Fig. 1, removed.

As best shown in Fig. 2, the channels 25 are for the play of the stop portions 18 of the pistons.

Reference to Fig. 4 will show that the periphery of the turbine wheel is provided with packing strip grooves, and that similar grooves are provided in the outer sides of the pistons 16 and in the peripheries of the sides 22 and 23.

As will be noted from Figs. 2 and 4 of the drawings, circular packing strips generally designated 26, are also employed in the motor, said strips 26 being arranged in circular grooves in the ends of the hub 11 and being arranged to bear against the covers or face plates 6 and 7.

Figure 1:
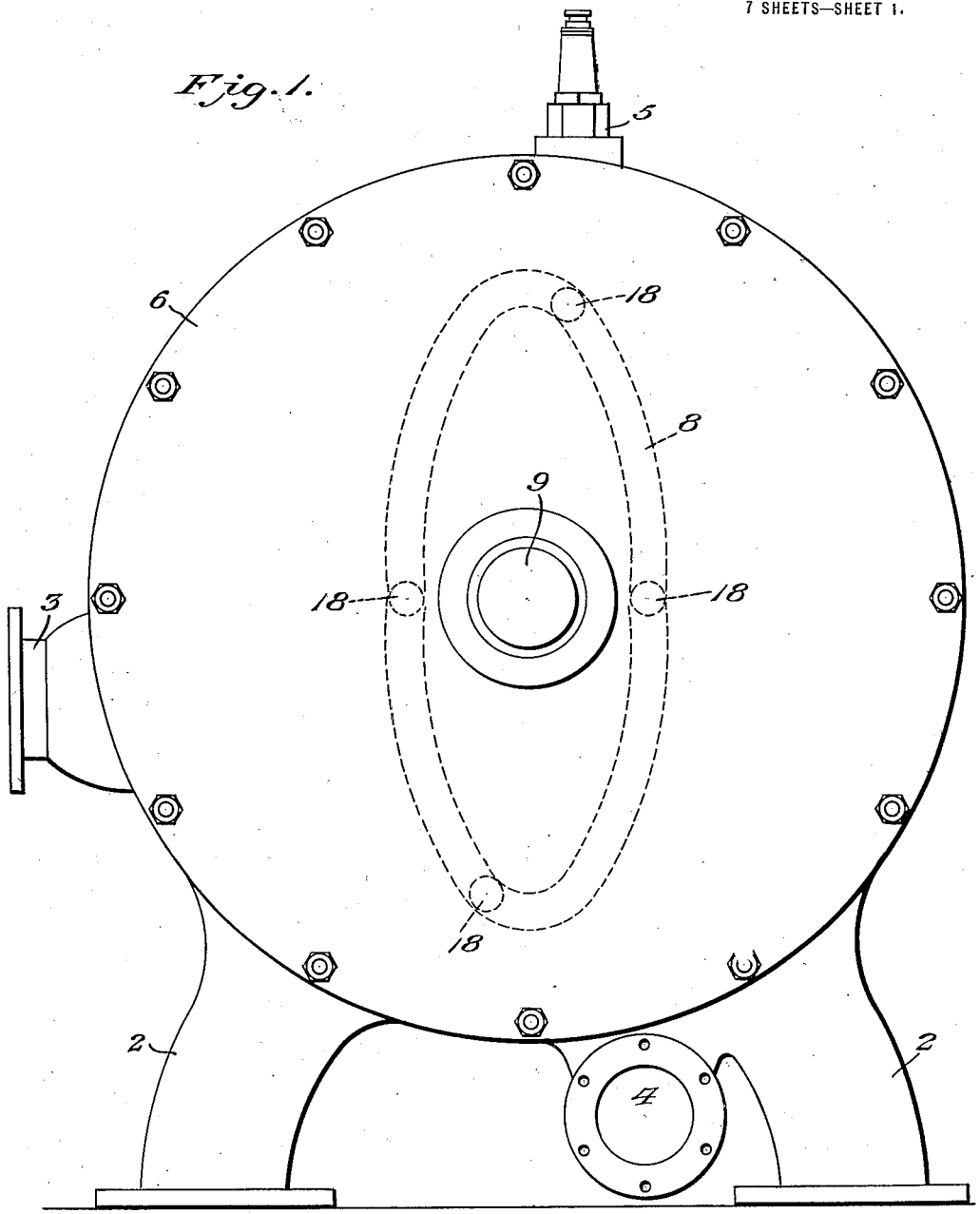
Figure 1 is a side elevation of the motor constituting the best practical embodiment of my invention that I have as yet devised.

In Fig. 1 is made clear the relative arrangement of the ignition point, intake port and exhaust port of the motor, and it will be noted that the motor is provided with a compression chamber space 30, an intake chamber space 40, an exhaust chamber space 50, and an expansion chamber space 60; the latter being of course arranged at the opposite side of the ignition point with reference to the chamber 30. Manifestly in the operation of the motor, the sides 23 and 24 will serve to prevent the explosive mixture and the products of combustion from escaping past the swinging pistons.

The present and preferred embodiment of my invention is an internal combustion motor of the four-cycle type; each piston 16 being adapted to take in explosive mixture, compress the said mixture and be moved by the expansion of burning gases, as well as to bring about the discharge of the products of combustion. It will be noted that when each piston 16 has completed its inward movement, the exhaust port will be opened to the chamber complementary to the said piston Fig. 3, and at this time there is nothing to obstruct the passage of the products of combustion to the atmosphere, and in consequence the chamber complementary to the piston referred to will be thoroughly cleared of products of combustion. From this it follows that the said chamber is made ready for the reception of a full charge of explosive mixture. It will therefore be noted that my novel motor requires only one spark plug with a four-point distributer, and that the four pistons on the turbine wheel are so constructed that they will always be in balance.

In the practical operation of my novel motor it will be understood that explosive mixture passes into one of the chambers of the wheel or rotary member 10 while the piston in said chamber is in its innermost position. As the chamber alluded to approaches the spark plug 5, the piston 16 in the chamber is moved outwardly so as to compress the explosive mixture. At the proper time the said compressed mixture is exploded whereupon the expanding products of combustion will act against the piston to force the same inwardly, and this operation will continue until the piston reaches the exhaust port 4 when the piston will be in its innermost position and all of the products of combustion will be free to escape from the chamber through the exhaust port 4. As each piston is moved toward and past the explosive mixture supply port 3, said piston will be positively moved inwardly and therefore will operate to draw explosive mixture through the port 3 into the chamber in which the piston is movable.

It will be appreciated from the foregoing that my novel motor is made up of a small number of parts, and that its operation is not attended by undue friction, and this notwithstanding the employment of the packing strips which are preferably backed by springs, as illustrated.

Having described my invention, what I claim and desire to secure by Letters-Patent, is:

1. In a rotary engine, a casing, a rotor mounted in a chamber in such casing, said rotor having an expansion chamber and the casing having inlet and exhaust ports with which such chamber may communicate, a piston having a pressure-receiving surface that lies toward the casing wall and in the form of a lever pivotally connected at one point of its length with the rotor, said piston swinging inward under pressure, and means forming a thrust support for the piston at another point in its length, and causing the piston at such point to travel in a path between the rotor axis and the chamber wall, and at a changing distance therefrom, the point of pivotal connection of the piston and the rotor being in advance, in the direction of rotor rotation of the point where the piston is acted on by said thrust support.

2. In a rotary engine, a casing, a rotor mounted in a chamber in the casing, said rotor having an expansion chamber and the casing having inlet and exhaust ports with which such chamber may communicate, the rotor having spaced radially extending arms that reach to the chamber wall, a piston in the form of a lever pivoted to each arm at the outer end thereof, the pressure-receiving surface of the piston lying toward the chamber wall, and means forming a thrust support for the piston toward the free end thereof, causing the piston at its point of support to travel in a path between the rotor axis and the chamber wall, and at a changing distance therefrom, the point of pivotal connection of the piston and the rotor being in advance, in the direction of rotor rotation of the point where the piston is acted on by said thrust support.

3. In a rotary engine, a casing having inlet and exhaust ports, a rotor mounted in a chamber in the casing, the rotor having spaced radially extending arms that reach to the chamber wall the space between adjacent arms being an expansion chamber, a piston in the form of a lever pivoted to each arm at the outer end thereof, the pressure-receiving surface of the piston lying toward the chamber wall, and an elliptical cam extending about the rotor axis engaging the lever and forming a thrust bearing therefor.

In testimony whereof I affix my signature.

HENRY D. ANDERSON.